(12) United States Patent
Esha

(10) Patent No.: US 12,515,816 B2
(45) Date of Patent: Jan. 6, 2026

(54) METHOD AND DEVICE FOR DEORBITING AN ARTIFICIAL SATELLITE FROM EARTH ORBIT BY REUSING MULTILAYER INSULATION (MLI)

(71) Applicant: Leibniz-Institut fuer Verbundwerkstoffe GmbH, Kaiserslautern (DE)

(72) Inventor: Esha, Kaiserslautern (DE)

(73) Assignee: Leibniz-Institut fuer Verbundwerkstoffe GmbH, Kaiserslautern (DE)

( * ) Notice: Subject to any disclaimer, the term of this patent is extended or adjusted under 35 U.S.C. 154(b) by 280 days.

(21) Appl. No.: 17/833,364

(22) Filed: Jun. 6, 2022

(65) Prior Publication Data
US 2022/0396377 A1    Dec. 15, 2022

(30) Foreign Application Priority Data
Jun. 10, 2021    (DE) .................. 10 2021 114 985.1

(51) Int. Cl.
*B64G 1/54*    (2006.01)
*B64G 1/10*    (2006.01)
(Continued)

(52) U.S. Cl.
CPC .............. *B64G 1/10* (2013.01); *B64G 1/242* (2013.01); *B64G 1/623* (2023.08)

(58) Field of Classification Search
CPC . B64G 1/242; B64G 1/10; B64G 1/54; B64G 1/62
(Continued)

(56) References Cited

U.S. PATENT DOCUMENTS 5,100,494 A * 3/1992 Schmidt ............ B29C 66/91221
219/535
5,853,151 A * 12/1998 Cussac ................... B64G 1/623
102/386
(Continued)

FOREIGN PATENT DOCUMENTS

CN         205539865 U  *  8/2016
WO    WO-2005051042 A1 *  6/2005  ............. D06F 75/24

OTHER PUBLICATIONS

ISO 24113, Space systems—Space debris mitigation requirements, Jul. 2019, ISO, Third edition (Year: 2019).*
(Continued)

*Primary Examiner* — Jelani A Smith
*Assistant Examiner* — George A Alcorn, III
(74) *Attorney, Agent, or Firm* — Collard & Roe, P.C.

(57) ABSTRACT

A method and a device for deorbiting artificial satellites with multilayer insulation arranges a deorbiting device beneath it. The device includes a spring element, a bonding agent, and a heating element designed to melt the bonding agent, which at least partially detaches at least one layer of the multilayer insulation from the satellite when a signal is transmitted to the satellite by rolling up or splaying out in the manner of a flap, enlarging its cross-sectional area. The partial detachment exposes the underlying satellite structure to environmental influences. This exposure accelerates the self-disintegration of the artificial satellite, reduces the mass, and increases the ballistic coefficient throughout the deorbiting period. This area enlargement and mass reduction reduce energy, resulting in re-entry into Earth's atmosphere. A number of layers can be arranged so that, regardless of the satellite rotation, at least one surface is always directed against the aerodynamic flow.

8 Claims, 5 Drawing Sheets

(51) Int. Cl.
*B64G 1/24* (2006.01)
*B64G 1/62* (2006.01)

(58) Field of Classification Search
USPC .............................................................. 701/3
See application file for complete search history.

(56) References Cited

U.S. PATENT DOCUMENTS

| | | | | |
|---|---|---|---|---|
| 6,830,222 | B1* | 12/2004 | Nock | B64G 1/2227 244/110 D |
| 7,465,492 | B2* | 12/2008 | Gilbert | C09J 5/00 428/355 R |
| 2012/0138748 | A1* | 6/2012 | Barnes | B64G 1/648 244/158.6 |
| 2013/0062472 | A1* | 3/2013 | Stokes | B64G 1/52 244/171.7 |
| 2015/0303582 | A1* | 10/2015 | Meschini | H01Q 15/161 343/840 |
| 2018/0273216 | A1* | 9/2018 | Oldham | B64G 1/2228 |
| 2020/0377239 | A1* | 12/2020 | Barnes | B64G 1/646 |

OTHER PUBLICATIONS

McDowell, "The edge of Space: Revisiting the Karman Line", 2018, Acta Astronautica, 151, 668-677 (Year: 2018).*

Park et al., "Re-entry survival analysis and ground risk assessment of space debris considering by-products generation", 2020, Acta Astronautica, 179, 604-618 (Year: 2020).*

ISO 24113, "Space systems—Space debris mitigation requirements", BSI Standards, Jul. 2019, ISO, Third edition (Year: 2019).*

Wang et al., "Optimization of variable density multilayer insulation for cryogenic application and experimental validation", 2016, Cryogenics, 80, 154-163 (Year: 2016).*

Mesforoush et al., "Experimental and numerical analyses of thermal performance of a thin-film multi-layer insulation for satellite application", 2019, Cryogenics, 102, 77-84. (Year: 2019).*

Flegel, S. K., Gelhaus, J., Mockel, M., Wiedemann, C., Krag, H., Klinkrad, H., & Vorsmann, P. Multi-layer insulation model for MASTER-2009. Germany: Elsevier (2011), Acta Astronautica 69 (2011) 911-922, 13 pages.

Gabryel, W., Hoidn, W., & Wolf, J. (2016). Alternative Bonding Methods for MLI blankets, 46th International Conference on Environmental Systems (p. 121). Austria: ICES (2016), 11 pages.

ESA Space Debris Office, Satellites vs Debris—In Numbers (2020), 1 page.

Euroconsult, Prospects for the Small Satellite Market, Forecasts to 2028, (2019), 7 pages.

ISO 24113, Space systems—Space debris mitigation requirements, (2019), 7 pages.

M.M. Finckenor, Multilayer Insulation Material Guidelines, NASA, Apr. 1999, 44 pages.

* cited by examiner

Detail see Fig. 4

METHOD AND DEVICE FOR DEORBITING AN ARTIFICIAL SATELLITE FROM EARTH ORBIT BY REUSING MULTILAYER INSULATION (MLI)

CROSS REFERENCE TO RELATED APPLICATIONS

Applicant claims priority under 35 U.S.C. § 119 of German Application No. 10 2021 114 985.1 filed Jun. 10, 2021, the disclosure of which is incorporated by reference.

BACKGROUND OF THE INVENTION

1. Field of the Invention

The present invention relates to a method and a device for deorbiting an artificial satellite from Earth orbit, the artificial satellite having multilayer insulation.

2. Description of the Related Art

Multilayer insulations are used on nearly all artificial satellites for thermal insulation. They encompass the outside of the satellites to protect these and their subsystems from environmental influences in orbit. They consist of several layers of thin, reflective plastic layers coated with metal, which are separated by poorly conductive or insulating filler materials. On near-Earth satellites, 15 to 20 layers are normally used (Flegel, S. K., Gelhaus, J., Möckel, M., Wiedemann, C., Krag, H., Klinkrad, H., & Vörsmann, P. (2011). Multi-layer insulation model for MASTER2009. Germany: Elsevier). These layers can have a total thickness of 5 to 12 mm. Such coatings are known, for example, from Gabryel, W., Hoidn, W., & Wolf, J. (2016). Alternative Bonding Methods for MLI blankets, 46th International Conference on Environmental Systems (p. 121). Austria: ICES and Finckenor, M., & Dooling, D. (1999). Multilayer Insulation Material Guidelines. Alabama: NASA Marshall Space Flight Center.

There are 34,000 objects of a size of more than 10 cm, 900,000 objects of a size of more than 1 cm and 128 million objects of a size of more than 1 mm in a low Earth orbit (LEO). These objects move at velocities of more than 11 km/s. 26,600 of these objects are identified according to the ESA (ESA Space Debris Office, 2020). Each satellite launch adds at least two objects to this, which can later split into numerous smaller objects; once upon launch of the satellite in the form of the last rocket stage and once at the end of the satellite service life of the inoperable satellite itself. Since the advent of the new space age with small satellites, the number of satellite launches has risen exponentially. In the period from 2014 to 2019, the number of satellite launches into a low Earth orbit increased from 2 to 3 satellites per week to 13 to 14 satellites per week (Euroconsult, 2019). In 2020, 1000 small satellites weighing less than 500 kg were launched. This equates to an average of 20 satellites per week. As a consequence of the greater number of satellites in Earth orbit, the risk of collisions is increasing. Due to these collisions, the debris can be introduced into Earth orbit uncontrolled as further objects. This debris can in turn cause collisions and generate further debris in a cascade effect. This effect is also known as the Kessler syndrome. The totality of inoperable objects orbiting Earth is also described as space junk. The threat posed by space junk on account of the launch of in particular multi-satellite constellations, in particular in low Earth orbit, is steadily increasing.

To facilitate secure access to space in the future also, the UN has introduced guidelines to reduce space junk for all rocket launches. ISO-24113 is intended to ensure safe access to space. According to this standard, every satellite or every non-functional object in a low Earth orbit should enter Earth's atmosphere or be transferred to a graveyard orbit within 25 years of its service life.

Devices and methods for deorbiting artificial satellites are known.

Active devices for deorbiting space junk are known in this regard. In the case of these devices, the space junk is collected by an additionally launched satellite and then allowed to burn up in the atmosphere together with the satellite. Collection can be carried out here via robot arms, nets or harpoons, for example. Before artificial satellites are launched, special targets can be mounted on them to make subsequent collection easier. What is disadvantageous about the active devices is that these necessitate additional rocket launches.

As well as active deorbiting devices, passive deorbiting devices are known.

Towing devices are known as passive deorbiting devices. With these deorbiting devices, a greater braking effect through atmospheric residues in low Earth orbit is achieved by enlargement of the satellite surface. The braking effect accelerates the re-entry of the satellites into the atmosphere. The towing device can be configured in this case as an extensible towing sail or boom, for example. This towing device is triggered at the end of the satellite's service life.

Electromagnetic cables are known for deorbiting satellites. In this technology, a conductive cable is used to generate an electromagnetic force when the electromagnetic cable moves relative to the Earth's magnetic field.

A disadvantage of the known devices is that this additional weight has to be brought into Earth orbit with the satellite, which in turn increases the costs of the rocket launch. Furthermore, limitations arise in the applicability to small satellites on account of the limited forces that can be attained.

SUMMARY OF THE INVENTION

The object of the present invention is to optimize the targeted deorbiting of satellites.

The object is achieved in a method for deorbiting artificial satellites from Earth orbit in that at least one, preferably more, particularly preferably all layers of the multilayer insulation are at least partially detached from the artificial satellite.

Artificial satellites here are, for example, rockets, rocket stages, satellites for monitoring, news or communications, or parts of rockets.

Due to the at least partial detachment of the layers from the artificial satellite, this can be exposed targetedly, i.e. at a desired time, to the environmental influences in the orbit. Due to the partial detachment of the layers, the protective layers of the satellite against environmental influences are at least partially removed. The now unprotected satellite is disintegrated by oxygen radicals, ultraviolet radiation and strong temperature variations. The material of the artificial satellite decomposes, for example, into $CO_2$, $H_2O$ and various metal oxides. This material degradation triggers the self-disintegration of the satellite as soon as it loses its function or the connection to Earth.

A preferred configuration of the invention consists in the detachment of at least one layer at the end of the service life of the artificial satellite.

During its functional service life, the satellite advantageously remains protected from environmental influences. Once the satellite reaches the end of its functional service life, for example due to a defect or due to planned decommissioning, self-disintegration can be initiated in a controlled manner. Initiation can be triggered here by a signal actively transmitted to the satellite. Initiation can also be automatic, for example on attaining a defined operating time or when contact with a control center is lost, for example.

It is expedient here for at least one layer of the multilayer insulation to be at least partially peeled off.

Peeling off means here that the layer is contracted such that parts of the artificial satellite are released from the protective layers of the multilayer insulation and thus exposed to environmental influences. The layer is not separated from the satellite here but removed by rolling up from a part of the satellite structure, for example.

Another embodiment of the invention consists in splaying out at least one layer of the multilayer insulation in the manner of a flap.

Parts already located on the satellite can advantageously be used in the method. No additional membrane for enlarging the surface of the artificial satellite is required.

Splaying out the layer enlarges the cross-sectional area of the artificial satellite. Due to the enlarged cross-sectional area, the artificial satellite is braked more strongly, whereby deorbiting of the artificial satellite takes place. The cross-sectional area can be enlarged here by extending the layer in the form of a flap. Large flat parts of the layers are preferably splayed. The braking effect in this case corresponds roughly to that of a stretched sail. Advantageously no additional membrane for enlarging the cross-sectional area is necessary. Due to the splaying, parts of the artificial satellite are released from the protective layers of the multilayer insulation and thus exposed to environmental influences. The self-disintegration of the artificial satellite is advantageously accelerated.

Several splayed layers are preferably oriented so that at least one surface is always directed against the aerodynamic flow, regardless of the position of the satellite.

Alternatively, individual layers and/or parts of a layer can be peeled off and/or splayed out.

The object is also achieved in the case of a device for deorbiting artificial satellites from Earth orbit in that means are provided for the at least partial detachment of at least one layer of the multilayer insulation from the artificial satellite.

One configuration of such a device consists in that the device is arranged under a multilayer insulation of a satellite and comprises a spring element, a heating element and a bonding agent.

The device is mounted under the multilayer insulation. The heating element can be configured here as thin-film heating. It can be printed onto thin polyimide films or other aerospace-grade materials. It can be printed as required in any shape and size. Thin-film heating of this kind is described, for example, in WO 2005/051042 A1. Here the thin-film heating consists of three thin layers of small thickness, for example <2 µm. The outer layers are electrically insulating layers, while the core layer is an electrically resistive layer. The core layer is connected to electric current sources. It is attached to the satellite structure under the multilayer insulation using an adhesive suitable for space flight.

The bonding agent bonds at least one layer of the multilayer insulation of the artificial satellite to the satellite structure. It can be an adhesive that is heat-soluble.

During the period in which the satellite carries out its mission, the heating element remains inactive. As soon as the satellite loses its functionality, for example by loss of radio contact with the ground or due to a collision with space junk, the heating element is automatically connected to the solar cells or the main energy source of the satellite. The heat generated by the heating element must be designed so that it is able to melt the bonding agent due to the supply of energy. The layer of the multilayer insulation that was previously connected by the bonding agent to the satellite structure detaches itself from the satellite structure. The layer is separated from the satellite structure by the spring element. The satellite structure is thereby released at least partially from the protective multilayer insulation. The satellite is now exposed to environmental influences. The environmental influences accelerate the self-disintegration of the artificial satellite. The described process is advantageously triggered when the satellite is outside the shadow of the Earth, so that the solar radiation can be used both to generate energy and for thermal support of the detachment process.

It is relevant for the invention that the spring element is a flat spring.

The flat spring functions here similarly to a slap bracelet for children. Following activation of the device and detachment of the at least one layer of the multilayer insulation from the satellite structure, the layer is rolled up by the flat spring. The satellite structure lying under the layer is advantageously exposed to environmental influences in this process. The flat spring is particularly suitable for detaching the layer of the multilayer insulation on uneven parts of the satellite surface.

Finally, it is according to the invention that the spring element is a torsion spring.

The layer of the multilayer insulation can be splayed out from the satellite surface similar to a flap by the torsion spring. Due to this splaying, the cross-sectional area of the artificial satellite is enlarged. Large, flat parts of the multilayer insulation are suitable for splaying in particular here. Advantageously no additional membrane has to be used for this. On the contrary, the multilayer insulation already applied to the satellite serves to augment the braking effect. Due to the augmented braking effect, the artificial satellite is advantageously braked until it burns up in Earth's atmosphere.

Alternatively, a combination of flat springs and torsion springs can also be used. This can be adapted accordingly to the geometry of the artificial satellite.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
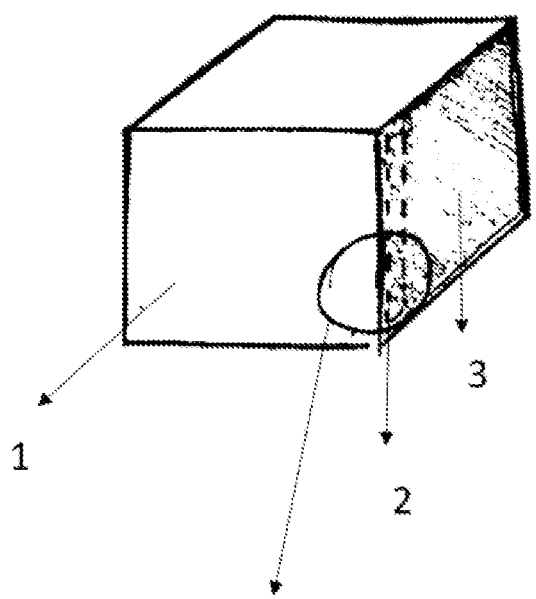
FIG. 1 shows a satellite according to the invention during the use phase.

FIG. 1 shows a satellite (1) according to the invention during the use phase. The device for deorbiting (2) is concealed under the multilayer insulation (3). The multilayer insulation (3) protects the structure and load of the satellite from environmental influences during the use phase, above all from radiation and temperature changes. Following the use phase of the satellite (1), the device for deorbiting (2) according to the invention changes the multilayer insulation (3) to enlarge the surface of the satellite (1). This can take place due to peeling off of the multilayer insulation (3) by means of a peeling mechanism or by spreading the multilayer insulation (3) by means of a tentering mechanism.

Figure 2:
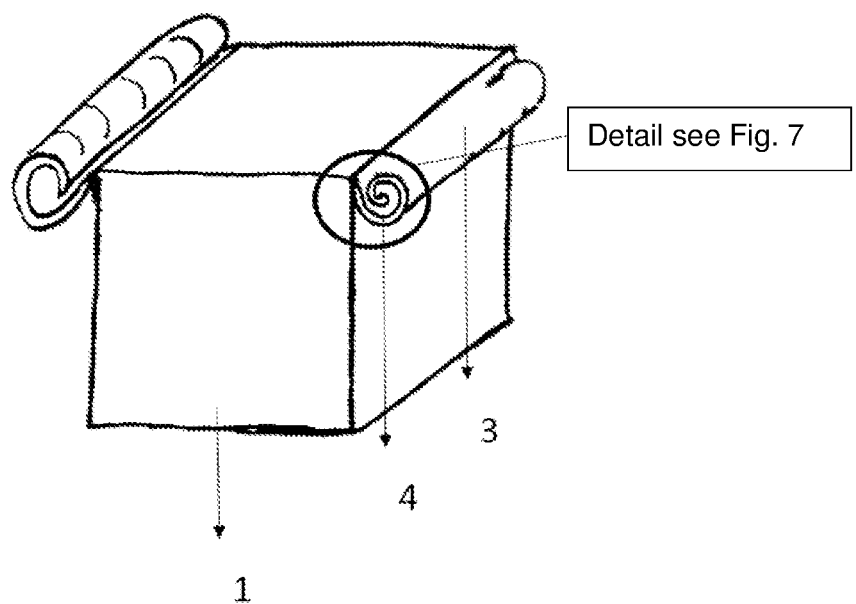
FIG. 2 shows a satellite according to the invention after the use phase in a first implementation.

FIG. 2 shows a satellite (1) according to the invention following the use phase with activated device for deorbiting, which is formed here as a peeling mechanism (4). On activation of the peeling mechanism (4), the multilayer insulation (3) is rolled up and remains on the satellite (1), which is exposed to radiation exposure in space, whereby the decomposition of the satellite structure, a reduction in mass and ultimately deorbiting commences.

Figure 3:
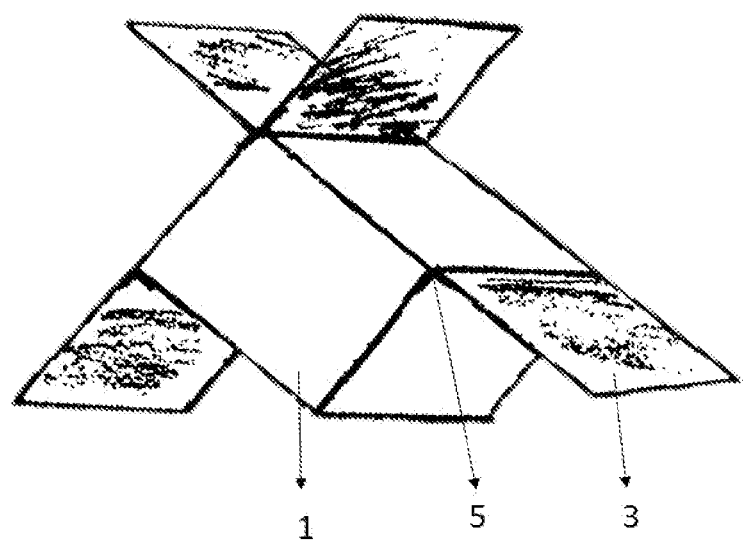
FIG. 3 shows a satellite according to the invention after the use phase in a second implementation.

FIG. 3 shows a satellite (1) according to the invention following the use phase with an activated device for deorbiting, which has a tentering mechanism (5). Following peeling off of the multilayer insulation (3), this is extended with the aid of the tentering mechanism (5) in the manner of a flap and thus significantly augments the cross-sectional area of the satellite (1), whereby this is braked sharply.

Figure 4:
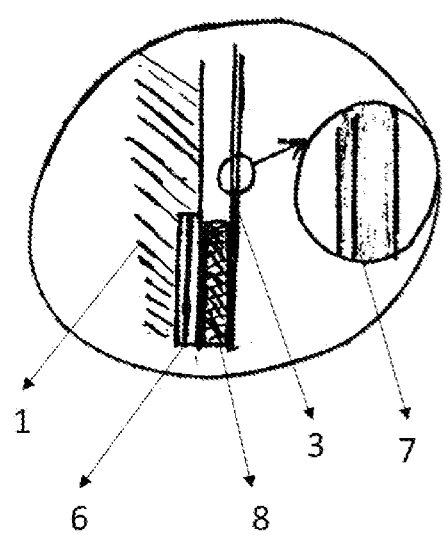
FIG. 4 shows a device according to the invention for deorbiting in a non-activated state.

FIG. 4 shows in detail an inventive peeling mechanism (4) in the non-activated state, consisting of a heating element (6) formed as thin-film heating element, a flat spring (7) integrated in the multilayer insulation (3) and a bonding agent (8).

Figure 5:
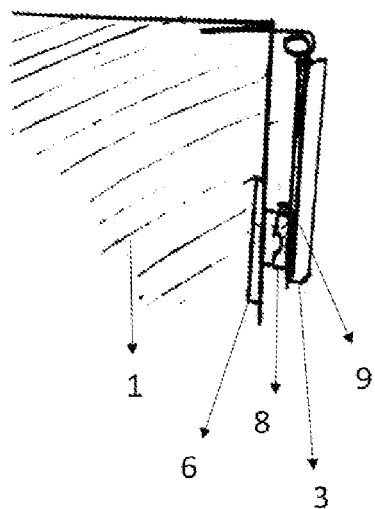
FIG. 5 shows a tentering mechanism according to the invention in a non-activated state.

FIG. 5 shows in detail an inventive tentering mechanism (5) in the non-activated state, consisting of a heating element (6) formed as a thin-film heating element, a bonding agent (8) and a pre-tensioned torsion spring (9) in the multilayer insulation (3).

Figure 6:
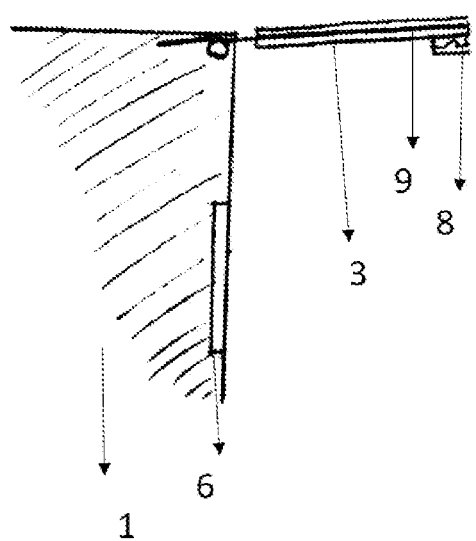
FIG. 6 shows a satellite according to the invention following the use phase with a first activated mechanism.

FIG. 6 shows a satellite (1) according to the invention following the use phase with the mechanism activated after the use phase, consisting of the thin-film heating element (6), the bonding agent (8) and the torsion spring (9), by which the multilayer insulation (3) is extended in the manner of a flap by the spanning force of the torsion spring (9).

Figure 7:
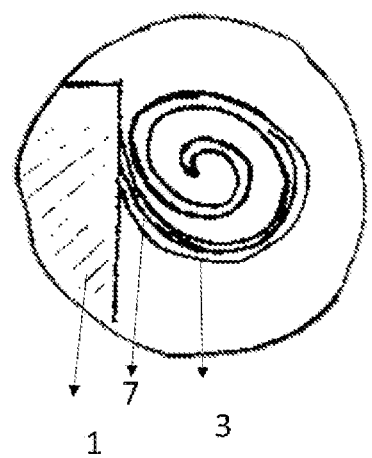
FIG. 7 shows a satellite according to the invention following the use phase with a second activated mechanism.

FIG. 7 shows a satellite (1) according to the invention following the use phase with the peeling mechanism activated following the use phase, consisting of the flat spring (7), in which the multilayer insulation (3) is rolled up by the tension force of the flat spring (7).

Although only a few embodiments of the present invention have been shown and described, it is to be understood that many changes and modifications may be made thereunto without departing from the spirit and scope of the invention.

What is claimed is:

1. A method for deorbiting in a space environment an artificial satellite having a satellite structure and multilayer insulation (MLI), the MLI comprising a plurality of reflective plastic layers coated with metal, each layer being physically disconnected and electrically isolated from adjacent layers by insulating spacer materials, the method comprising:

arranging under the MLI a deorbiting device comprising a spring element, a heating element, and a bonding agent, wherein the bonding agent bonds at least one layer of the MLI to the satellite structure, wherein the heating element is designed to melt the bonding agent, and when a signal is actively transmitted to the satellite at least partially peeling off the at least one layer of the MLI from the artificial satellite using the deorbiting device whereby the at least one layer is not separated from the satellite but removed from a part of the satellite by rolling the at least one layer up or by splaying out the at least one layer of the MLI in the manner of a flap to enlarge a cross-sectional area of the artificial satellite via the MLI alone to cause an increase in braking effect of the satellite as well as a reduction in mass due to exposure to the space environment which accelerates deorbiting ultimately.

2. The method according to claim 1, wherein the peeling off of the at least one layer of the MLI takes place at the end of the service life of the artificial satellite.

3. The method according to claim 1, wherein the at least one layer of the MLI is splayed out in the manner of a flap by a spanning force of the spring element.

4. The method according to claim 1, wherein a number of splayed-out layers of the MLI are oriented such that regardless of the position of the satellite, at least a largest surface of one of the splayed-out layers of the MLI is always directed against the aerodynamic flow.

5. A device for deorbiting artificial satellites from Earth orbit according to the method according to claim 1, wherein means are provided for at least partial detachment of the at least one layer of the MLI from the artificial satellite, wherein the means comprises the spring element, the heating element, and the bonding agent, wherein the heating element comprises a thin-film heater, wherein the bonding agent is a heat-soluble adhesive, and wherein the device is configured to be arranged under the MLI of the artificial satellite.

6. The device according to claim 5, wherein the spring element is a flat spring.

7. The device according to claim 5, wherein the spring element is a torsion spring.

8. The method according to claim 1, wherein the at least one layer of the MLI is not separated from the satellite but removed from the part of the satellite by rolling the at least one layer up to expose the part to the space environment.

\* \* \* \* \*